(12) United States Patent
Yamasaki et al.

(10) Patent No.: US 9,091,805 B2
(45) Date of Patent: Jul. 28, 2015

(54) ULTRASONIC MOTOR AND LENS APPARATUS INCLUDING THE SAME

(75) Inventors: Ryo Yamasaki, Tokyo (JP); Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 13/557,526

(22) Filed: Jul. 25, 2012

(65) Prior Publication Data

US 2013/0033152 A1 Feb. 7, 2013

(30) Foreign Application Priority Data

Aug. 5, 2011 (JP) .................................. 2011-172013

(51) Int. Cl.
*H02N 2/00* (2006.01)
*G02B 7/10* (2006.01)
*H02N 2/10* (2006.01)
*G03B 17/00* (2006.01)

(52) U.S. Cl.
CPC ................ *G02B 7/102* (2013.01); *G03B 17/00* (2013.01); *H02N 2/006* (2013.01); *H02N 2/0015* (2013.01); *H02N 2/103* (2013.01); *G03B 2205/0084* (2013.01)

(58) Field of Classification Search
CPC ..... H02N 2/006; H02N 2/103; H02N 2/0055; H02N 2/10
USPC ........................................ 310/323.01–323.21
See application file for complete search history.

(56) References Cited

U.S. PATENT DOCUMENTS

| | | | |
|---|---|---|---|
| 4,019,073 A | 4/1977 | Vishnevsky et al. | |
| 5,136,200 A | 8/1992 | Takizawa et al. | |
| 5,247,220 A | 9/1993 | Miyazawa et al. | |
| 2004/0090146 A1 | 5/2004 | Miyazawa | |
| 2006/0113868 A1* | 6/2006 | Sakatani et al. | 310/323.17 |
| 2008/0174206 A1* | 7/2008 | Sakamoto | 310/323.09 |

(Continued)

FOREIGN PATENT DOCUMENTS

| | | |
|---|---|---|
| CN | 1327301 A | 12/2001 |
| JP | 4-145880 A | 5/1992 |
| JP | 2004-304887 A | 10/2004 |

(Continued)

OTHER PUBLICATIONS

Search Report in European Patent Application No. 12178801.2, dated Apr. 3, 2014.
Office Action in Korean Patent Application No. 10-2012-0084298, dated Sep. 26, 2014.
Office Action in Chinese Patent Application No. 201210278148.2, dated Aug. 12, 2014.
Office Action issued in Japanese Patent Application No. 2011-172013, dated Nov. 13, 2014.

*Primary Examiner* — Derek Rosenau
(74) *Attorney, Agent, or Firm* — Fitzpatrick, Cella, Harper & Scinto

(57) ABSTRACT

An ultrasonic motor includes a vibrator including a contact surface that is brought into contact with a member to be driven, and a piezoelectric element fixed thereto, the vibrator configured to drive the member to be driven by an ultrasonic vibration excited by the piezoelectric element; and a pressurization unit supported by a fixing unit, the pressurization unit configured to apply a bias force to the vibrator so as to impress the contact surface against the member to be driven. The pressurization unit includes a pressurization member held by the fixing unit so as to move in a direction perpendicular to the contact surface while being restricted to move in a direction parallel to the contact surface; and an elastic member that applies an impressing force in the direction perpendicular to the contact surface to the vibrator via the pressurization member.

25 Claims, 6 Drawing Sheets

(56) References Cited

U.S. PATENT DOCUMENTS

2009/0267454 A1  10/2009  Takizawa
2011/0133606 A1   6/2011  Yoshida et al.
2011/0309722 A1* 12/2011  Seki et al. ............... 310/323.16

FOREIGN PATENT DOCUMENTS

| | | |
|---|---|---|
| JP | 2009-153379 A | 7/2009 |
| JP | 4504152 B2 | 7/2010 |
| JP | 4652784 B2 | 3/2011 |

* cited by examiner

ULTRASONIC MOTOR AND LENS APPARATUS INCLUDING THE SAME

BACKGROUND OF THE INVENTION

1. Field of the Invention

The present invention relates to an ultrasonic motor for driving a member to be driven by generating an ellipsoidal vibration on an impressed vibrator, and to a lens apparatus using the ultrasonic motor.

2. Description of the Related Art

An ultrasonic motor has been conventionally used as a driving source for driving, for example, a lens mechanism or a camera, taking advantage of silent operation, driving capability from low speed to high speed, and high torque output. For example, an ultrasonic motor disclosed in Japanese Patent No. 4,652,784 includes an annular member to be driven having a rotation axis, and multiple vibrators. Each vibrator is in a so-called pressurized contact condition with respect to the member to be driven, i.e., the vibrator is in contact with the member to be driven in a state of being impressed against the member to be driven. The vibrators are arranged on the annular member to be driven at predetermined intervals. When an ultrasonic vibration is excited on the vibrator under the pressurized contact condition, an ellipsoidal motion is generated on the vibrator at a portion in contact with the member to be driven, so that the member to be driven is driven to rotate about the rotation axis of the member to be driven. The pressurized contact condition of the vibrator with respect to the member to be driven is obtained by biasing, with use of a plate spring, a portion of the vibrator corresponding to a vibration node set near the center of the vibrator. An impressing force of the plate spring is adjusted by a screw and an adjustment washer provided near a fixing portion of the plate spring.

However, the ultrasonic motor disclosed in Japanese Patent No. 4,652,784 includes a complicated adjustment mechanism for adjusting the impressing force applied to the vibrator with a number of components constituting the adjustment mechanism. In addition, the plate spring of the adjustment mechanism is formed into a linear form that can stay within the annular form, and therefore, the plate spring has a small overall length and a high spring constant. As a result, slight adjustment of the plate spring leads to a significant change in the impressing force, and hence fine adjustment is needed.

SUMMARY OF THE INVENTION

The present invention has been made in consideration of the above situation, and in an ultrasonic motor that drives a member to be driven by an ellipsoidal vibration generated on a vibrator, an appropriate impressing force is obtained without using a mechanism for adjusting the impressing force for causing the vibrator to come into pressurized contact with a contact surface of the member to be driven, thus obtaining an appropriate pressurized contact condition between the vibrator and the member to be driven.

According to the present invention, provided is an ultrasonic motor, comprising: a vibrator including a contact surface that is brought into contact with a member to be driven, and including a piezoelectric element fixed thereto, the vibrator configured to drive the member to be driven by an ultrasonic vibration excited by the piezoelectric element; and a pressurization unit supported by a fixing unit, the pressurization unit configured to apply a bias force to the vibrator so as to impress the contact surface against the member to be driven, in which the pressurization unit comprises: a pressurization member held by the fixing unit so as to move in a direction perpendicular to the contact surface while being restricted to move in a direction parallel to the contact surface; and an elastic member that applies an impressing force in the direction perpendicular to the contact surface to the vibrator via the pressurization member.

Further features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings.

First Embodiment

Exemplary embodiments of the present invention are described below with reference to the accompanying drawings. Although a rotary driving type motor that is formed in a unit as an actuator for driving a lens barrel or the like for a digital camera is described as an example of an ultrasonic motor according to this embodiment, its usage is not limited to this.

Figure 1:
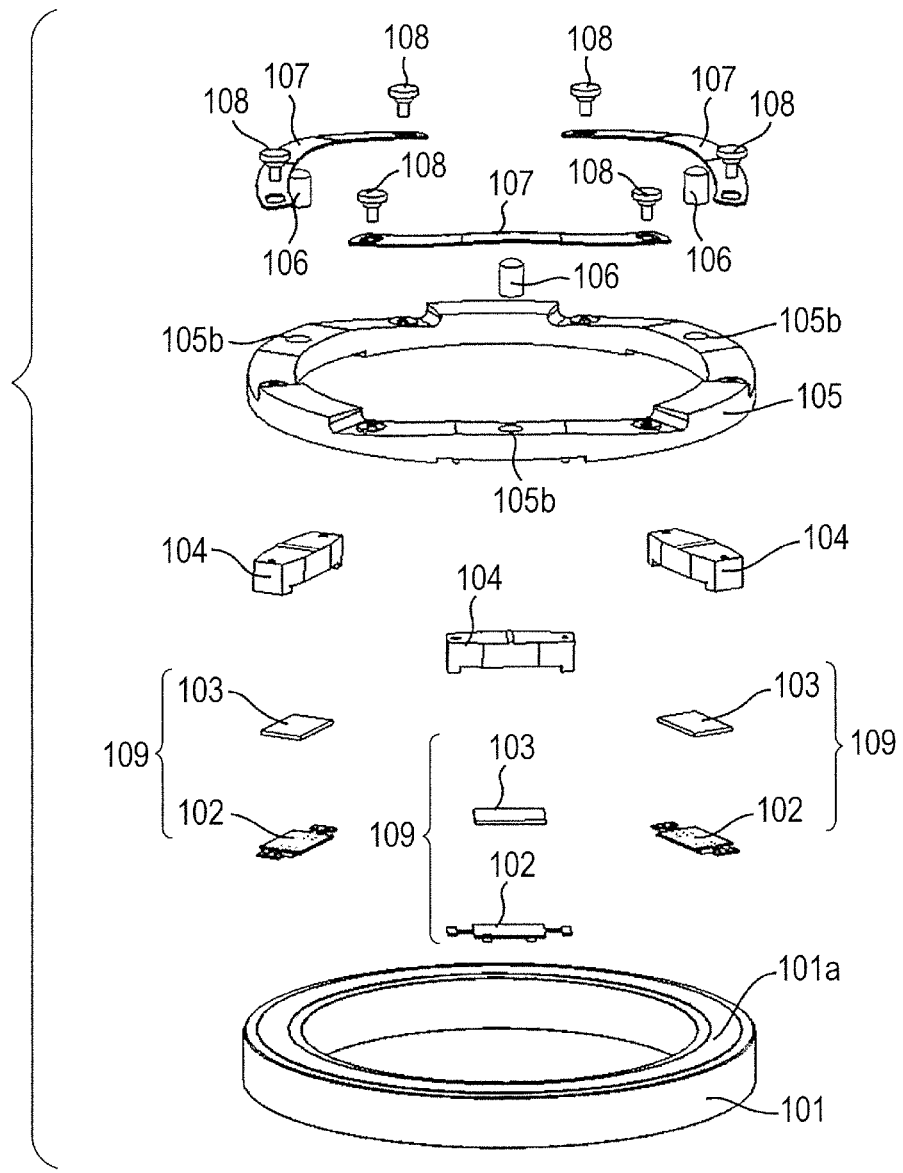
FIG. 1 is an exploded perspective view of an ultrasonic motor according to a first embodiment of the present invention.

FIG. 1 is an exploded perspective view of an ultrasonic motor according to a first embodiment of the present invention. In the figures, the same members are represented by the same reference symbols. As illustrated in FIG. 1, the ultrasonic motor according to the first embodiment includes a rotor 101, a vibration plate 102, a piezoelectric element 103, a smaller base 104, a ring base 105, a pressurization member 106 and a plate spring 107. The rotor 101 is a member to be driven, including a contact surface 101a with which a vibrator 109 described later comes into pressurized contact by an impressing force. The vibration plate 102 is a member in contact with the contact surface 101a under a pressurized contact condition involving an impression. The piezoelectric element 103 is tightly adhered to the vibration plate 102 with an adhesive or the like. When a voltage is applied to the piezoelectric element 103 in a state in which the piezoelectric element 103 is tightly adhered to the vibration plate 102, an ultrasonic vibration is generated, so that an ellipsoidal motion can be generated on the vibration plate 102. The vibration plate 102 and the piezoelectric element 103 constitute the vibrator 109. In this embodiment, the vibrator 109 is provided at three points, thus driving the rotor 101 to rotate. The smaller base 104 is a holding member for holding the vibrator 109. The ring base 105 is a fixing member for holding the smaller base 104, and the pressurization member 106 and plate spring 107. The pressurization member 106 is fitted into a through hole part 105b of the ring base 105, and is held to move only in a direction substantially perpendicular to the contact surface 101a of the rotor 101, thus causing the vibrator 109 to come into pressurized contact with the rotor 101 via the smaller base 104 by an impressing force from the plate spring 107 described later. The plate spring 107 serves as an elastic member, which is fixed to the ring base 105 with a screw 108 at each end portion thereof, and causes the vibrator to come into pressurized contact with the member to be driven by an impressing force of the plate spring. The pressurization member 106 and the plate spring 107 constitute a pressurization unit of the present invention.

As described above, the above-mentioned members are assembled in a unit as an ultrasonic motor.

Figure 2:
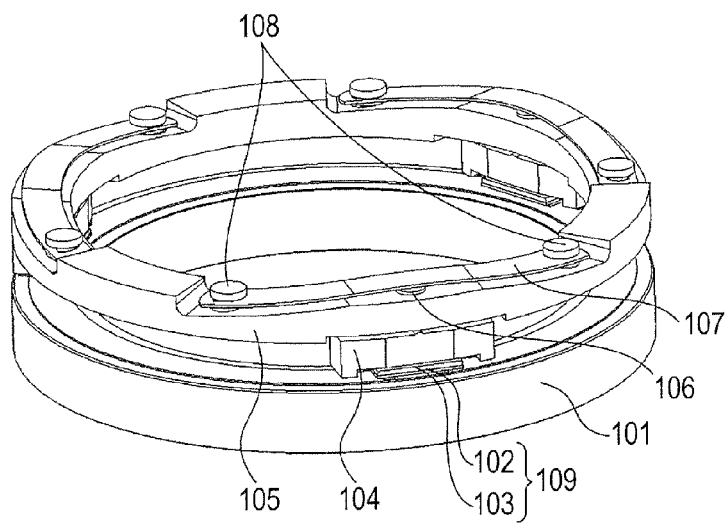
FIG. 2 is a perspective view for illustrating an assembled state of members illustrated in FIG. 1.

FIG. 2 is a perspective view for illustrating an assembled state of the members illustrated in FIG. 1. In FIG. 2, a configuration around the vibrator 109 is the same for all three points, and hence, to simplify the figure, the reference symbols are assigned only to a front side in the figure. As illustrated in FIG. 2, at each of the three points of the ring base 105, an impressing force is applied to the vibrator 109 by the plate spring 107 that is fixed with the two screws 108 via the pressurization member 106 and the smaller base 104, and as a result, the vibrator 109 and the contact surface 101a of the rotor 101 come into pressurized contact with each other. When actually mounting the ultrasonic motor on the lens barrel or the like, the rotor 101 is coupled to a focusing mechanism or a zoom mechanism for driving.

Figure 3:
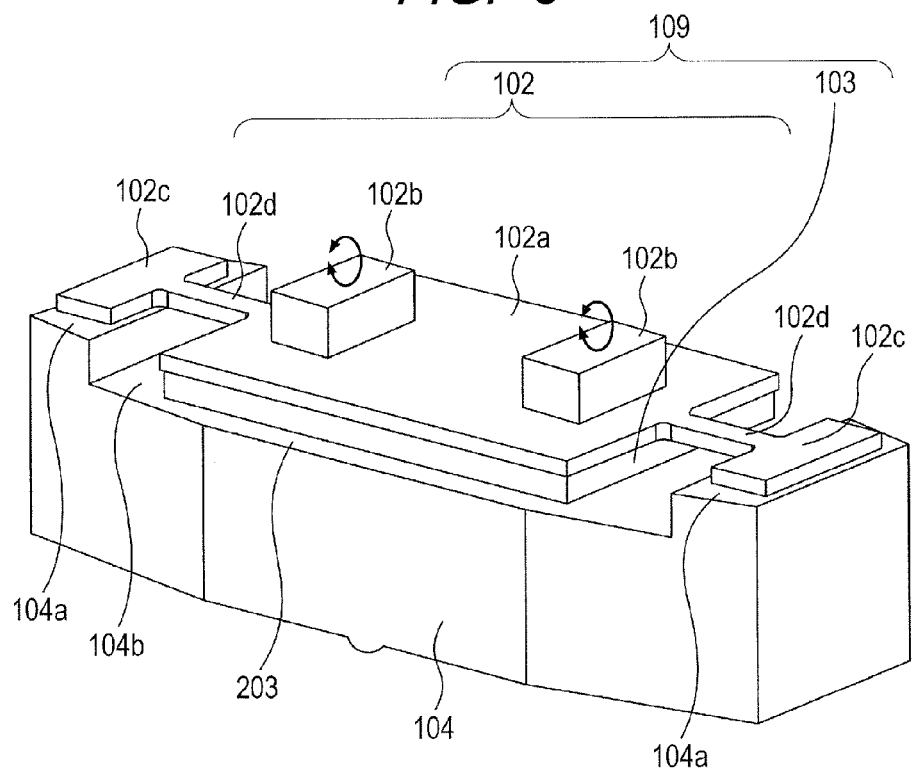
FIG. 3 is an enlarged perspective view for illustrating a joined state of a vibrator and a smaller base.

Hereinafter, details on the structural members of the ultrasonic motor are described. FIG. 3 is an enlarged perspective view for illustrating a junction status of the vibration plate 102 and the smaller base 104 illustrated in FIGS. 1 and 2 as viewed from the rotor 101 side. As illustrated in FIG. 3, two projection parts 102b are formed on a plate part 102a at the center of the vibration plate 102. Upper end surfaces of the projection parts 102b, i.e., surfaces coming into abutment on the contact surface 101a of the rotor 101, are formed on the same plane, and in order to obtain an appropriate abutment condition with respect to the contact surface, the upper end surfaces are finished as smooth surfaces by polishing or the like in a manufacturing process.

On the other hand, the piezoelectric element 103 is tightly adhered to a back surface side of the plate part 102a illustrated in FIG. 3 (a surface side opposite to the surface on which the two projection parts 102b are formed) with an adhesive or the like. The method of tightly adhering the piezoelectric element 103 to the back surface of the plate part 102a is not limited as long as the two components are tightly adhered to each other. The piezoelectric element 103 includes multiple piezoelectric element films laminated and integrated. An application of a desired alternate-current (AC) voltage to the piezoelectric element 103 formed by laminating the multiple piezoelectric element films causes a vibration, thus exciting two vibration modes on the vibration plate 102 having the piezoelectric element 103 tightly adhered thereto. At this time, by setting vibration phases of the two vibration modes to obtain a desired phase difference, an ellipsoidal motion is generated on the projection parts 102b as indicated by arrows illustrated in FIG. 3. The ellipsoidal motion is generated on the vibrator 109 at the three points as illustrated in FIGS. 1 and 2 and transferred to the contact surface 101a of the rotor 101, so that the rotor 101 can be driven to rotate. Details on the above-mentioned laminated structure of the piezoelectric element and the above-mentioned vibration mode are substantially the same as the contents described in Japanese Patent Application Laid-Open No. 2004-304887. The entire content of Japanese Patent Application Laid-Open No. 2004-304887 is hereby incorporated by reference as if presented herein in its entirety.

Two junction parts 102c for joining to higher upper surface parts 104a formed on both sides of the smaller base 104 are formed on both ends of the vibration plate 102. Although the vibration plate 102 is joined to the smaller base 104 by welding or adhering at the junction part 102c, the method of joining the vibration plate 102 and the smaller base 104 is not limited as long as the vibration plate 102 and the smaller base 104 are joined to each other. Two arm parts 102d are formed respectively between the two junction parts 102c and the plate part 102a, and the vibration plate 102 and the piezoelectric element 103 are fixed to the smaller base 104 via the arm parts 102d. The arm parts 102d are formed into a narrower shape than the plate part 102a and the junction part 102c as illustrated in FIG. 3 to achieve such a configuration that hardly transfers the vibration generated on the plate part 102a to the junction part 102c. In other words, a coupling configuration for preventing the vibration generated on the plate part 102a from being interrupted by the smaller base 104 that is a rigid member is achieved by the junction parts 102c. In addition, a predetermined space 203 is formed between a flat portion 104b near the center of the smaller base 104 and a surface (not shown) of the piezoelectric element 103 facing the flat portion 104b.

Figure 4A:
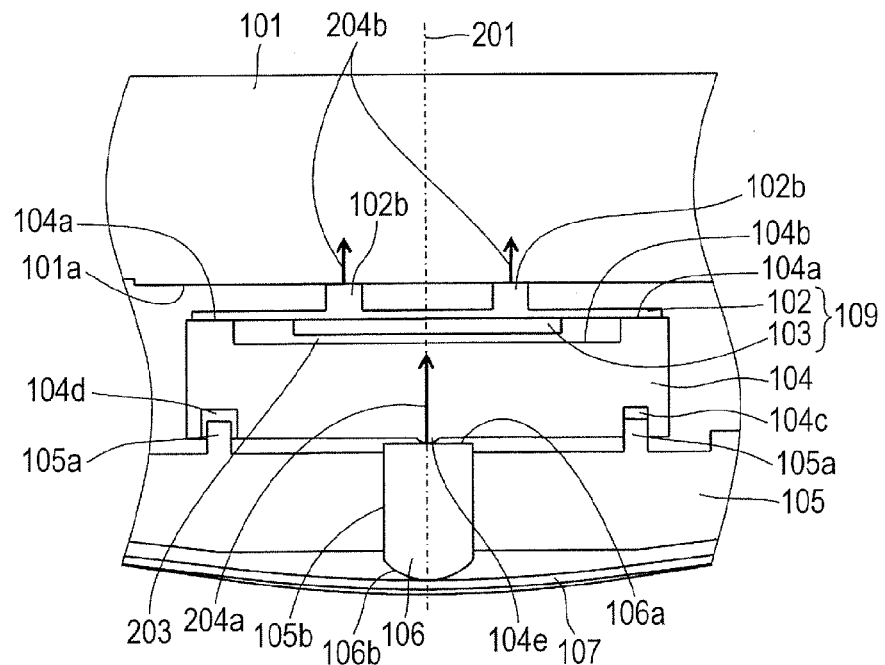
FIG. 4A is an enlarged cross-sectional view for illustrating the assembled state of the members according to the first embodiment.
Figure 4B:
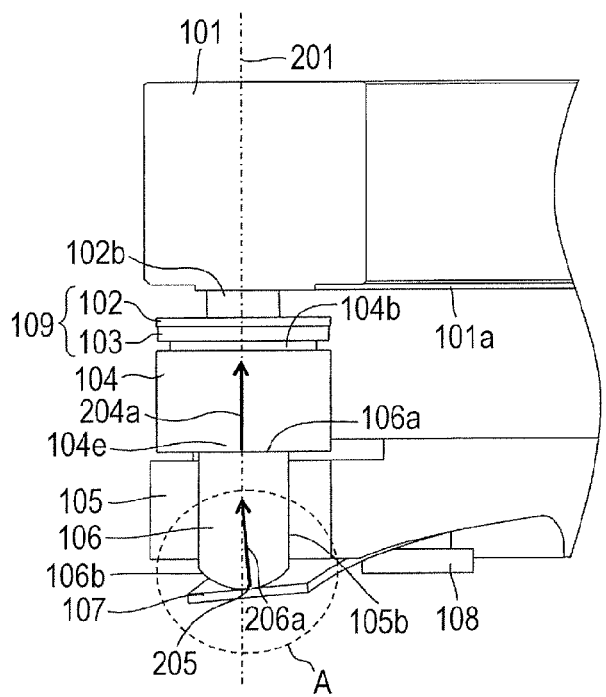
FIG. 4B is an enlarged cross-sectional view for illustrating the assembled state of the members according to the first embodiment.

FIGS. 4A and 4B are enlarged cross-sectional views for illustrating the assembled state of the members, in which only a surrounding area of one of the three vibrators 109 illustrated in FIG. 2 is illustrated in an enlarged manner. The rest of two vibrators have the same configuration, and a description thereof is omitted.

FIG. 4A is a view in which the rotor 101 is located on the upper side, having a cutting plane on a plane including respective centers of gravity of the upper end surfaces coming into contact with the contact surface 101a of the rotor 101 in the two projection parts 102b of the vibration plate 102 and respective normals of the upper end surfaces originated at the respective centers of gravity.

FIG. 4B illustrates a cutting plane on a plane including a center of gravity of the whole upper end surface coming into contact with the contact surface 101a in the projection parts 102b of the vibration plate 102 illustrated in FIG. 3 and a normal of the contact surface 101a, and perpendicular to the view illustrated in FIG. 4A. The whole upper end surface refers to a surface including all the two upper end surfaces.

In FIGS. 4A and 4B, a center line 201 is a line passing through the center of gravity of the whole upper end surface coming into contact with the contact surface 101a in the projection parts 102b of the vibration plate 102 and including the normal of the contact surface 101a.

The upper end surfaces of the projection parts 102b come into abut on the contact surface 101a of the rotor 101, and are held in a pressurized contact condition. In addition, the junction parts 102c on both ends of the vibration plate 102 are joined to the smaller base 104 at the two upper surface parts 104a. The predetermined space 203 is then formed between the piezoelectric element 103 and the flat portion 104b of the smaller base 104.

A hole part 104c and an elongated hole part 104d are provided on the lower surface side of the smaller base 104, and two shaft parts 105a formed on the ring base 105 are respectively fitted therein. An abutting part 104e is provided on the lower center of the smaller base 104. The abutting part 104e is formed into a half cylindrical shape in which an arc shape illustrated in FIG. 4A extends in a direction of the depth of the drawing sheet (a lateral direction in FIG. 4B). An upper end surface 106a of the pressurization member 106 comes into contact with the abutting part 104e. The upper end surface 106a is formed as a flat surface, and hence the contact with the abutting part 104e is a line contact having a length in the direction of the depth of the drawing sheet in FIG. 4A (the lateral direction in FIG. 4B). Although the abutting part 104e is formed into the half cylindrical shape having the arc shape as described above in the first embodiment, the shape of the abutting part 104e is not limited as long as the abutting part 104e and the upper end surface 106a of the pressurization member 106 can maintain the line contact of a straight line.

The ring base 105 includes the through hole part 105b on a surface facing the plate spring 107 as illustrated in FIG. 1, and the pressurization member 106 comes into contact with the plate spring 107 by being fitted in the through hole part 105b, thus cooperating with the plate spring 107. The center axes of the through hole part 105b and the pressurization member 106 substantially match the center line 201, i.e., an axial direction perpendicular to the contact surface 101a. The plate spring 107 is deformed to come into contact with a spherical surface part 106b on the lower side of the pressurization member 106 in FIGS. 4A and 4B in a state in which the pressurization member 106 is biased against the smaller base 104 by an elastic force of the plate spring 107.

The plate spring 107 needs to have a reduced spring constant to some extent in order to reduce a fluctuation of the impressing force due to a change of a deformation amount. Therefore, it is desired that the plate spring 107 be as thin as possible and the plate spring 107 be as long as possible. The plate spring 107 according to the first embodiment is formed with use of a thin plate into an arc shape in order to achieve as large a spring length as possible in the annular ultrasonic motor. With this structure, the fluctuation of the impressing force can be suppressed even when a displace amount of the pressurization member 106 in the impressing direction is changed to some extent. Therefore, unlike a conventional example, a mechanism for adjusting the impressing force is not necessary. With the above-mentioned configuration, the vibrator 109 is impressed against the rotor 101 by the plate spring 107 via the smaller base 104 and the pressurization member 106.

A configuration for transferring the impressing force by the plate spring 107 is described below with reference to FIGS. 4A, 4B and 4C. In the following description, an impressing force vector is a force vector including a direction and a magnitude of the impressing force in the cross section of each figure.

As illustrated in FIG. 4A, the smaller base 104 is held in contact with the pressurization member 106 at the abutting part 104e. The smaller base 104 is further held in contact with the rotor 101 at the two projection parts 102b, and the center of gravity of each contact surface is located at the same distance from the center line 201 in the driving direction of the rotor. On the other hand, regarding the contact between the plate spring 107 and the pressurization member 106, the plate spring is formed into an arc shape in the first embodiment, and hence the support parts on both ends of the plate spring 107 and an input point of the impressing force (a contact point between the plate spring 107 and the pressurization member 106) do not exist on a straight line. Therefore, a cross section of the plate spring when generating the impressing force is in a state having an inclination as illustrated in FIG. 4B. As a result, the impressing force vector input to the pressurization member 106 by the plate spring 107 can be indicated by an arrow 206a. The contact point between the pressurization member 106 and the plate spring 107 does not exist on the center line 201, and in FIG. 4B, the contact point is shifted to a point 205 on the right side of the center line 201.

Figure 4C:
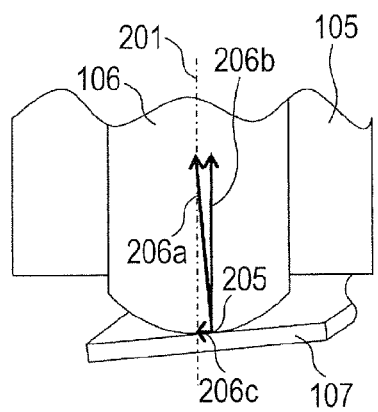
FIG. 4C is an enlarged detail view of a portion A illustrated in FIG. 4B, for illustrating component vectors of an impressing force of an elastic member.

FIG. 4C is an enlarged detail view of a vicinity of the point 205 in a portion A illustrated in FIG. 4B. The impressing force applied to the pressurization member 106 by the plate spring 107 is represented by the vector 206a, which is inclined with respect to the center line 201. Therefore, the impressing force vector 206a can be divided into a component vector 206b in a direction parallel to the center line 201 and a component vector 206c in a direction perpendicular to the center line 201.

As illustrated in FIGS. 4A and 4B, the pressurization member 106 is held by the ring base 105 with a degree of freedom only in a direction substantially parallel to the center line 201. That is, movement of the pressurization member 106 is allowed in the direction substantially perpendicular to the plane at which the projection parts 102b and the contact surface 101a of the rotor 101 come into contact with each other while it is restricted in a direction parallel to the plane. Thus, the impressing force vector 206a applied to the pressurization member 106 by the plate spring 107 is transferred to the smaller base 104 with a force (vector 204a) corresponding to the component vector 206b in the direction of the center line 201.

On the other hand, the impressing force (vector 204a) transferred to the smaller base 104 is transferred to the contact surface 101a by the two projection parts 102b, and a force of impressing the contact surface 101a by each of the projection parts 102b is a half (vector 204b) of the impressing force vector 204a. Therefore, the impressing forces on the two projection parts 102b can be evenly maintained.

The contact between the projection parts 102b and the contact surface 101a is a surface contact, and hence, in practice, the impressing force is evenly distributed on the plane. However, for the sake of better understanding, the impressing force is represented as a force vector acting on a position of the center of gravity of the plane. Likewise, the contact between the pressurization member 106 and the abutting part 104e of the smaller base 104 is a line contact, and hence, in practice, the impressing force vector is evenly distributed on the line. However, the impressing force vector is also represented as a force vector acting on a position of the center of gravity of the line. Hereinafter, the impressing force is represented as a force vector at the position of the center of gravity for both the surface contact and the line contact.

In addition, on a side surface part of the pressurization member 106, a frictional force is generated by the component vector 206c of the impressing force vector 206a input to the pressurization member 106 by the plate spring 107, the component vector 206c acting in the direction perpendicular to the center line 201. On the other hand, a frictional force is also generated on the fitting portions of the shaft parts 105a. These frictional forces are ignored because these are sufficiently small with respect to the impressing force. In practice, if the finishing of the side surface is smoothened to some extent, an influence of the frictional forces can be reduced to a level that can be ignored.

In the first embodiment, as described above, the pressurization member 106 is substantially held on the ring base 105 in a state of having a degree of freedom only in the direction of the center line 201. Therefore, the impressing force vector 204a applied to the smaller base 104 by the pressurization member 106 can be substantially matched with the center line 201. At this time, the magnitude of the impressing force vector 204a is equal to the component vector 206b of the impressing force vector 206a by the plate spring in the direction parallel to the center line 201. This is because only the component vector 206b of the impressing force vector 206a works as the impressing force vector 204a. The component vector 206c of the impressing force vector 206a in the direction perpendicular to the center line 201 affects the frictional force on the side surface part of the pressurization member 106. Through the smooth finishing of the surfaces, the frictional force generated between the side surface of the pressurization member 106 and an internal surface of the through hole part 105b is sufficiently small compared to the impressing force, and does not interfere with a smooth reciprocating movement of the pressurization member 106. Finally, the impressing force vector applied to the contact surface 101a by one of the projection parts 102b is the impressing force vector 204b, and its magnitude is a half of the impressing force vector 204a. This is because the projection parts 102b exist at two points as illustrated in FIG. 4A. In this manner, referring to the cross sections illustrated in FIGS. 4A and 4B, the point of load of the input impressing force vector 206a is shifted from the center line 201, and the direction of the impressing force vector 206a is not parallel to the center line 201, but the impressing force vectors 204a and 204b can maintain an appropriate impressing force.

As described above, in this embodiment, the smaller base 104 is not impressed by the plate spring 107 in a direct manner but impressed via the pressurization member 106 that is held to have a degree of freedom substantially only in the direction perpendicular to the contact surface 101a, i.e., a direction of a plane vector of the contact surface 101a. With this configuration, impression against the contact surface 101a in the direction perpendicular to the contact surface 101a can be achieved with a small fluctuation of the bias force by the plate spring with respect to a displace amount in the impressing direction regardless of deformation of the plate spring 107 at the time of the impression. Therefore, the plate spring 107 can also be formed into an arc shape, so that the plate spring 107 can be placed within the annular ultrasonic motor. Further, as large a length as possible can be secured and the spring constant can be reduced. As a result, the deformation amount of the plate spring 107 can be increased at the time of the impression, and hence the fluctuation of the impressing force due to the change in the deformation amount can be reduced, eliminating the need for the mechanism for adjusting the impressing force unlike the conventional technology.

On the other hand, the smaller base 104 is impressed via a line-shaped contact part of the abutting part 104e. Therefore, in the cross section illustrated in FIG. 4A, the smaller base 104 can be inclined and can maintain an appropriate pressurized contact condition even when inclination of a member occurs due to a dimension error at the time of manufacturing or a disturbance.

Figure 5:
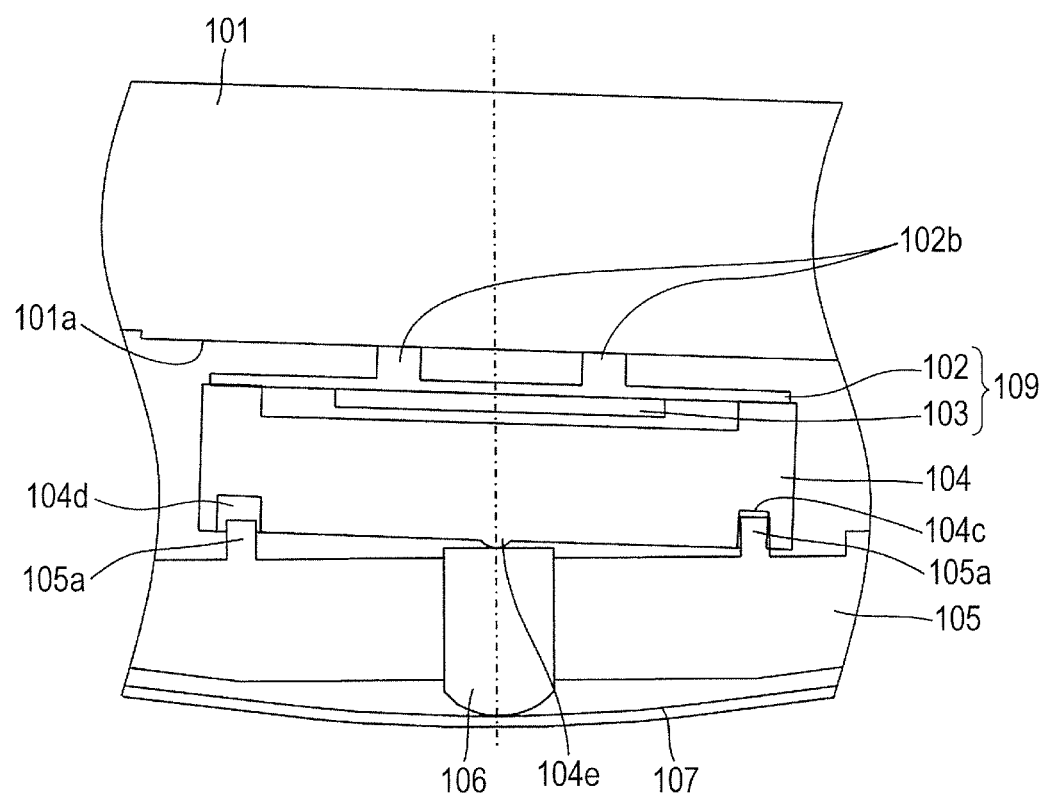
FIG. 5 is an enlarged cross-sectional view for illustrating a case in which a rotor and a ring base are respectively inclined.

FIG. 5 is a cross-sectional view in the same cross section of the same members illustrated in FIG. 4A, for illustrating a case in which relative rotational inclination occurs about the abutting part 104e of the smaller base 104 on the rotor 101 and the ring base 105 compared to the state illustrated in FIG. 4A. Even in FIG. 5, the projection parts 102b of the vibration plate 102 follow the contact surface 101a of the rotor 101, thus maintaining an appropriate pressurized contact condition. Although the ring base 105 is fitted into the smaller base 104 by the hole part 104c, the elongated hole part 104d, and the shaft parts 105a, the smaller base 104 and the ring base 105 can be relatively inclined because there is a fitting clearance, i.e., a fitting space. Therefore, the contact surface 101a can be appropriately impressed at the two projection parts 102b even when inclination of a member occurs on the rotor 101 and the ring base 105 due to a dimension error at the time of manufacturing or even when inclination of a member occurs on the rotor 101 and the ring base 105 due to a vibration or a disturbance at the time of driving.

That is, in the cross section of FIG. 4A, even when the inclination as in the case illustrated in FIG. 5 occurs between the members, such a problem is solved by bringing the abutting part 104e of the smaller base 104 and the pressurization member 106 of FIG. 4A into point contact and maintaining a following capability between the contact surfaces with respect to the inclination. On the other hand, in the cross section illustrated in FIG. 4B, the smaller base 104 and the pressurization member 106 are not inclined with respect to each other in the lateral direction in FIG. 4B by bringing the abutting part 104e of the smaller base 104 and the pressurization member 106 into line contact of a straight line.

As described above, in this embodiment, the vibrator 102 is impressed against the rotor 101 via the smaller base 104 to which the vibrator 102 is joined at both ends, thus enabling a pressurized contact therebetween without interfering with a vibration applied to the vibrator 102 by the piezoelectric element 103. In addition, the impression on the smaller base 104 is achieved by biasing from the plate spring 107 via the pressurization member 106 that is held to have a degree of freedom only in the direction perpendicular to the contact surface 101a, and hence appropriate impression can be achieved regardless of a deformation condition of the plate spring 107. Further, the impression is achieved by providing the abutting part 104e on the smaller base 104, and hence an appropriate pressurized contact condition can be maintained regardless of inclination of a member due to a dimension error occurred at the time of manufacturing or a disturbance.

Although the vibrator is held by the smaller base 104 and impressed via the smaller base 104 in the first embodiment, if the vibration node is located at the center of the vibrator as in the conventional technology, the vibrator can be directly impressed at a vicinity of the center without involving the smaller base 104.

Second Embodiment

A second embodiment of the present invention is a modification example of the first embodiment, in which the three plate springs 107 respectively corresponding to the three pressurization members 106 are integrated. With this configuration, the plate spring 107 and the screw 108 can be omitted, leading to a cost reduction effect.

Figure 6:
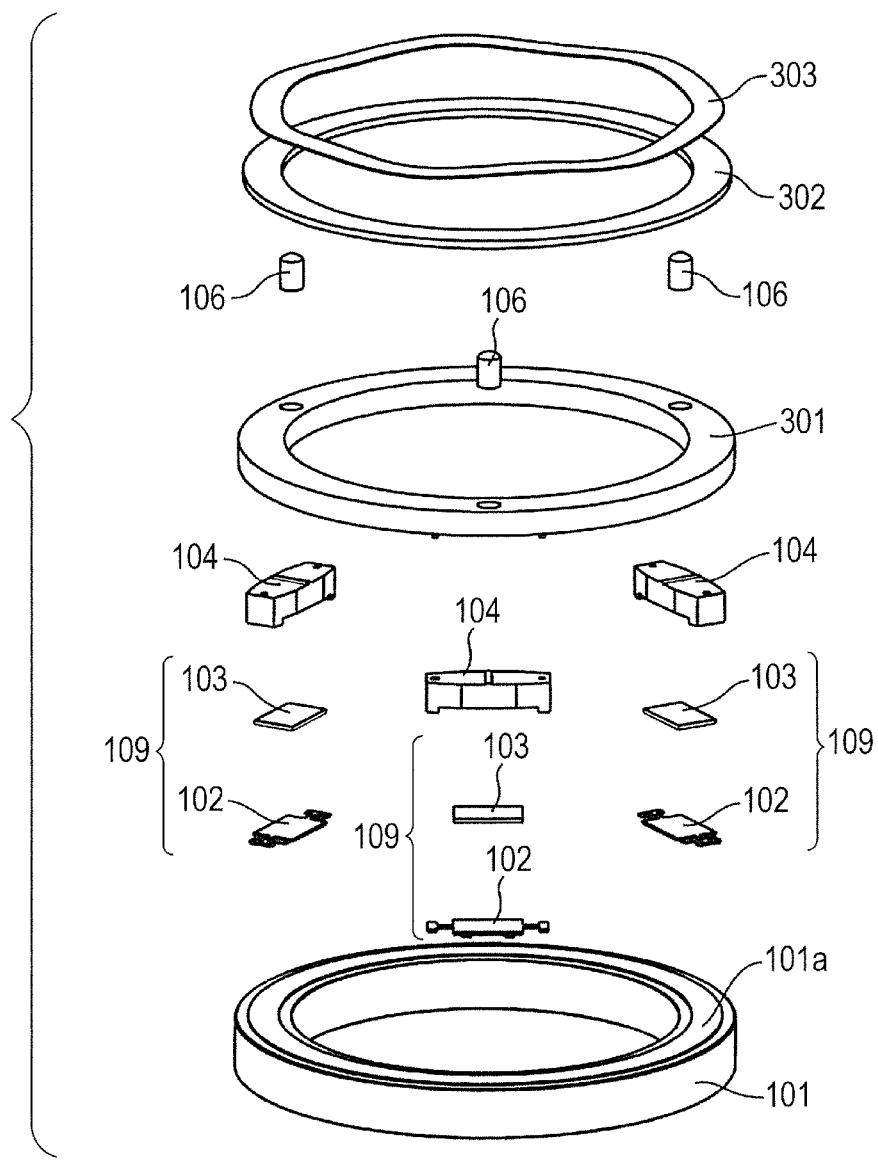
FIG. 6 is an exploded perspective view of an ultrasonic motor according to a second embodiment of the present invention.

FIG. 6 is an exploded perspective view of an ultrasonic motor according to the second embodiment of the present invention. In the figure, the same members represented by the same reference symbols, and also the same members as those of the first embodiment are represented by the same reference symbols. As illustrated in FIG. 6, a ring base 301 according to the second embodiment only includes shaft parts 105a for positioning the smaller base 104 and through hole parts 105b for fitting the pressurization members 106 therein. A washer 302 is held in contact with the three pressurization members 106. A wave washer 303 is provided to impress the washer 302. A stationary member (not shown) is provided on an upper portion of the wave washer 303, and by sandwiching the wave washer 303 between the stationary member and the washer 302, a wave form of the wave washer 303 is squeezed by a predetermined amount to generate an impressing force.

Figure 7:
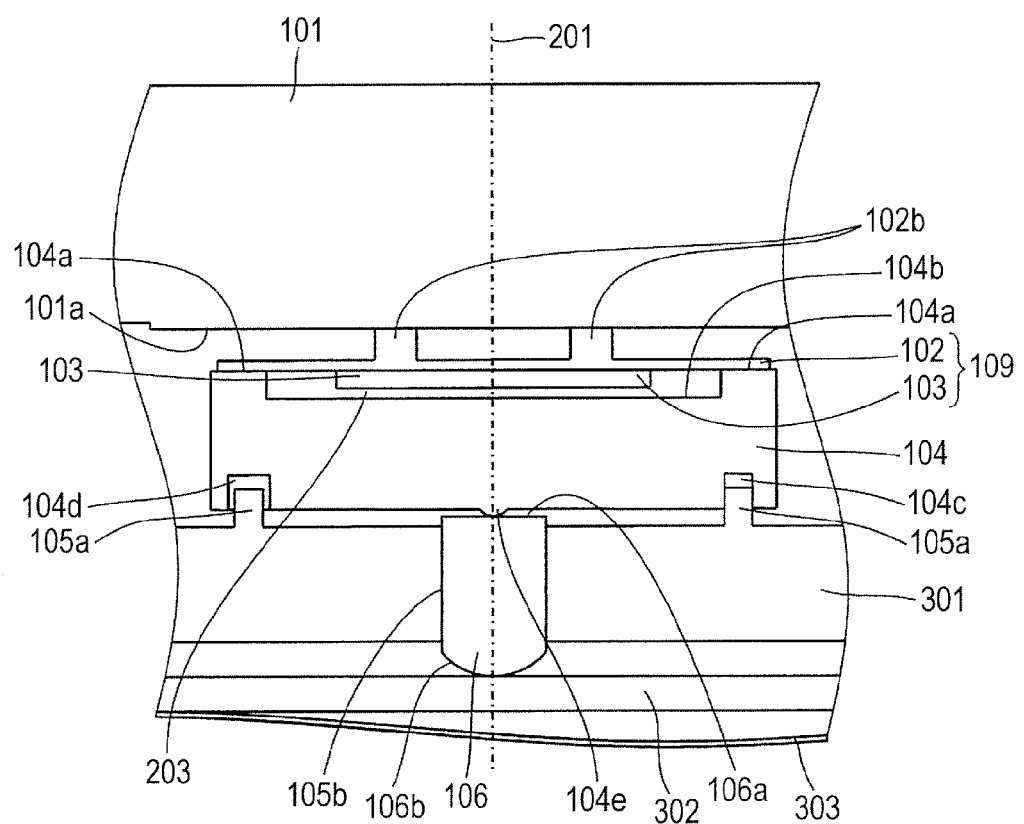
FIG. 7 is an enlarged cross-sectional view for illustrating an assembled state of members illustrated in FIG. 6.

FIG. 7 is an enlarged cross-sectional view for illustrating an assembled state of members according to the second embodiment. As illustrated in FIG. 7, the wave washer 303 is squeezed by the predetermined amount, and thus the impressing force is transferred to the pressurization member 106 via the washer 302. The subsequent configuration for transferring the impressing force is the same as that of the first embodiment.

By the way, in the first embodiment, the plate spring 107 is fixed to the ring base 105, and hence an absolute position of the ring base 105 in the direction of the center line 201 illustrated in FIGS. 4A and 4B is determined depending on the deformation amount of the plate spring 107. However, in the second embodiment, the ring base 301 only takes a role of holding the smaller base 104 and the pressurization member 106, and the wave washer 303 is not fixed. Thus, the position of the ring base 301 in the direction of the center line 201 is not determined. Therefore, when mounting the ultrasonic motor according to the second embodiment to a lens barrel or the like, for example, the ring base 301 can be fixed to take a desired absolute position with respect to a stationary tube in the barrel, so that the ring base 301 does not move unintentionally. Alternatively, the ring base 301 can be integrated with the stationary tube depending on the configuration.

Therefore, in the second embodiment, the single wave washer 303 is commonly used for the three pressurization members 106 as an elastic member that exerts impression against the three pressurization members 106, and hence there is no need for a plate spring and a screw, leading to cost reduction.

Third Embodiment

A lens apparatus having the effect of the present invention can be achieved by employing the ultrasonic motor according to the first or second embodiment as a driving unit for driving a focusing lens or a zoom lens in the lens apparatus.

As described above, in the ultrasonic motor that drives the member to be driven by an ellipsoidal vibration generated on the vibrator, an appropriate pressurized contact condition can be obtained at the contact surface by transferring an impressing force from the elastic member to the vibrator via the pressurization member configured to move in the direction perpendicular to the contact surface of the vibrator and the member to be driven without using the mechanism for adjusting the impressing force, which has been used in the conventional technology.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-172013, filed Aug. 5, 2011, which is hereby incorporated by reference herein in its entirety.

What is claimed is:

1. A motor, comprising:
   a vibrator configured to include a contact surface that is brought into contact with a member and a piezoelectric element, and wherein the vibrator is configured to cause a movement relative to the member by a drive of the piezoelectric element;
   a fixing unit configured to have a through-hole part having an axial direction perpendicular to the contact surface; and
   a pressurization unit guided by the through-hole part of the fixing unit, wherein the pressurization unit is configured to apply, while being restricted from movement in a direction parallel to the contact surface by the through-hole part of the fixing unit, a bias force to the vibrator so as to press the contact surface against the member,
   wherein the pressurization unit comprises:
      a pressurization member; and
      an elastic member that applies a pressing force in the direction perpendicular to the contact surface to the vibrator via the pressurization member.

2. The motor according to claim 1, wherein the pressurization member comprises a contact part that is brought into point contact with the elastic member.

3. The motor according to claim 1, further comprising a holding part configured to hold the vibrator,
   wherein the holding part comprises an abutting part that is brought into line contact with the pressurization member in a direction perpendicular to a driving direction of the member.

4. The motor according to claim 3, wherein the abutting part has a cross-section in a half cylindrical shape.

5. The motor according to claim 1, wherein the elastic member comprises an arc-shaped plate spring.

6. A lens apparatus, comprising the motor according to claim 1.

7. The motor according to claim 1, wherein the vibrator is configured to cause the movement relative to the member by an ultrasonic vibration by the drive of the piezoelectric element.

8. A motor, comprising:
   a vibrator configured to include a contact surface that is brought into contact with a member and a piezoelectric element, and wherein the vibrator is configured to cause a movement relative to the member by a drive of the piezoelectric element;
   a fixing unit configured to have a through-hole part having an axial direction perpendicular to the contact surface; and
   a pressurization unit guided by the through-hole part of the fixing unit, wherein the pressurization unit is configured to apply, while being restricted from movement in a direction parallel to the contact surface via a support of the fixing unit, a bias force to the vibrator so as to press the contact surface against the member,
   wherein the pressurization unit comprises:
      multiple pressurization members; and
      an elastic member that is commonly used for at least two of the multiple pressurization members and applies a pressing force in the direction perpendicular to the contact surface to the vibrator via the at least two of the multiple pressurization members.

9. The motor according to claim 8, wherein the elastic member comprises a wave washer.

10. A lens apparatus, comprising the motor according to claim 8.

11. The motor according to claim 8, wherein the vibrator is configured to cause the movement relative to the member by an ultrasonic vibration by the drive of the piezoelectric element.

12. A motor, comprising:
   a vibrator configured to include a contact surface that is brought into contact with a member and a piezoelectric element, and wherein the vibrator is configured to cause a movement relative to the member by a drive of the piezoelectric element;
   a fixing unit configured to have a through-hole part having an axial direction perpendicular to the contact surface; and
   a pressurization unit supported by the fixing unit, wherein the pressurization unit is configured to apply, while being restricted from movement in a direction parallel to the contact surface via the support of the fixing unit, a bias force to the vibrator so as to press the contact surface against the member, wherein the pressurization unit comprises:
an elastic member arranged on an opposite side of the vibrator across the fixing unit; and
a pressurization member inserted in the through-hole part of the fixing unit and biased in a direction perpendicular to the contact surface by the elastic member.

13. A lens apparatus, comprising the motor according to claim 12.

14. The motor according to claim 12, wherein the vibrator is configured to cause the movement relative to the member by an ultrasonic vibration by the drive of the piezoelectric element.

15. A vibration actuator, comprising:
a vibrator configured to include a contact surface that is brought into contact with a first member and a piezoelectric element, and wherein the vibrator is configured to cause a movement relative to the first member by a drive of the piezoelectric element;
a fixing unit configured to have a through-hole part having an axial direction perpendicular to the contact surface; and
a pressurization unit guided by the through-hole part of the fixing unit and contacted to a second member which is connected to the vibrator, wherein the pressurization unit is configured to apply, while being restricted from movement in a direction parallel to the contact surface in the through-hole part of the fixing unit, a bias force to the vibrator so as to press the contact surface against the first member by an elastic member.

16. The vibration actuator according to claim 15, wherein the pressurization unit comprises a contact part that is brought into point contact with the elastic member.

17. The vibration actuator according to claim 15, wherein the second member comprises an abutting part that is brought into line contact with the pressurization unit in a direction perpendicular to a driving direction of the first member.

18. The vibration actuator according to claim 17, wherein the abutting part has a cross-section in a half cylindrical shape.

19. The vibration actuator according to claim 15, wherein the elastic member comprises an arc-shaped plate spring.

20. A lens apparatus, comprising the vibration actuator according to claim 15.

21. The vibration actuator according to claim 15, wherein the vibrator is configured to cause the movement relative to the first member by an ultrasonic vibration by the drive of the piezoelectric element.

22. A vibration actuator, comprising:
a vibrator configured to include a contact surface that is brought into contact with a first member and a piezoelectric element, and wherein the vibrator is configured to cause a movement relative to the first member by a drive of the piezoelectric element;
a fixing unit configured to have a through-hole part having an axial direction perpendicular to the contact surface; and
a pressurization unit guided by the through-hole part of the fixing unit and contacted to a second member which is connected to the vibrator, wherein the pressurization unit is configured to apply, while being restricted from movement in a direction parallel to the contact surface via a support of the fixing unit, a bias force to the vibrator so as to press the contact surface against the first member by an elastic member, wherein the elastic member is commonly used for at least two of multiple pressurization members and applies the bias force in 23. The vibration actuator according to claim 22, wherein the elastic member comprises a wave washer.

24. A lens apparatus, comprising the vibration actuator according to claim 22.

25. The vibration actuator according to claim 22, wherein the vibrator is configured to cause the movement relative to the first member by an ultrasonic vibration by the drive of the piezoelectric element.

* * * * *